United States Patent [19]
Keller et al.

[11] Patent Number: 5,100,600
[45] Date of Patent: Mar. 31, 1992

[54] METHOD OF MAKING AN ABSORBENT PAPER-CONTAINING GRANULATE

[75] Inventors: Fritz Keller, Stationstrasse 71, CH-8606 Nänikon-Greifensee Schweiz; Elisabeth Müllhaupt, Grüt/Gossau, both of Switzerland

[73] Assignee: Fritz Keller, Nänikon-Greifensee, Switzerland

[21] Appl. No.: 624,315

[22] Filed: Dec. 7, 1990

[30] Foreign Application Priority Data

Dec. 9, 1989 [CH] Switzerland .................. 04427/89

[51] Int. Cl.$^5$ .................. A01K 1/015; B29B 9/00
[52] U.S. Cl. .................. 264/112; 119/171; 119/172; 119/173; 264/115; 264/118; 264/122; 264/140; 264/141
[58] Field of Search ............... 264/112, 115, 118, 122, 264/131, 140, 141; 119/171, 172, 173; 427/212

[56] References Cited

U.S. PATENT DOCUMENTS

| | | | |
|---|---|---|---|
| 3,821,346 | 6/1974 | Batley, Jr. .................. | 264/115 |
| 3,972,971 | 8/1976 | Dantoni .................. | 264/115 |
| 4,263,873 | 4/1981 | Christianson .................. | 119/172 |
| 4,341,180 | 7/1982 | Cortigene et al. .................. | 119/172 |
| 4,374,794 | 2/1983 | Kok .................. | 264/122 |
| 4,378,756 | 4/1983 | Whiteman .................. | 119/172 |
| 4,409,925 | 10/1983 | Brundrett .................. | 119/173 |
| 4,532,890 | 8/1985 | Ohki et al. .................. | 119/172 |
| 4,560,527 | 12/1985 | Harke .................. | 264/500 |
| 4,570,573 | 2/1986 | Lohman .................. | 119/172 |
| 4,607,594 | 8/1986 | Thacker .................. | 119/172 |
| 4,621,011 | 11/1986 | Fleischer et al. .................. | 119/172 |
| 4,676,196 | 6/1987 | Lojek et al. .................. | 119/172 |
| 4,721,059 | 1/1988 | Lowe et al. .................. | 119/172 |
| 4,924,808 | 5/1990 | Pirotte .................. | 119/171 |

FOREIGN PATENT DOCUMENTS

| | | | |
|---|---|---|---|
| 1172025 | 8/1984 | Canada . | |
| 0121055 | 7/1984 | European Pat. Off. ............ | 119/172 |
| 2618641 | 7/1987 | France .................. | 119/172 |
| 58-111625 | 7/1983 | Japan .................. | 119/171 |
| 8304094 | 6/1985 | Netherlands .................. | 119/172 |

OTHER PUBLICATIONS

Brochure—Clerici & Co. Pelletier-Technik, "Entsorgen Recycling"; Brochure—Tecnica Mangimistic Veronese Srl.

Primary Examiner—Mary Lynn Theisen
Attorney, Agent, or Firm—Peter K. Kontler

[57] ABSTRACT

A method of making an absorbent granulate of paper, with or without additives, includes mechanically comminuting paper into irregular and/or strip-shaped fragments, crumpling and interlacing the fragments with attendant development of internal spaces (cavities) in the interlaced and crumpled fragments, rough pressing the interlaced and crumpled fragments into prepressed formations (e.g., into tubes having a diameter of up to or even in excess of 10 mm), and converting the prepressed formations into particles, particularly into granules or pellets. The crumpling and interlacing step can include agitating the fragments in one or more streams of a gaseous fluid and/or kneading the fragments. The additives can be admixed during at least one of the comminuting, crumpling and interlacing, rough pressing and converting steps and can include substances which reduce the specific weight of granules, substances which alter the magnetic and/or electrostatic properties of the mixture of fragments and additives, aromatic substances, deodorants, disinfectants or materials which influence the wettability of paper. Up to 20 percent by weight of water can be added to paper in the course of at least one of the comminuting, crumpling and interlacing, rough pressing and converting steps. The granulate can be used as litter or as an oil binding material.

30 Claims, No Drawings

METHOD OF MAKING AN ABSORBENT PAPER-CONTAINING GRANULATE

BACKGROUND OF THE INVENTION

The invention relates to improvements in methods of making absorbent materials, for example, granules, pellets or other relatively small particles which can be used as litter, as oil binding materials or for related and analogous purposes. Still more particularly, the invention relates to improvements in methods of making absorbent particles which contain paper. The invention also relates to granules, pellets and like particles which are produced in accordance with the method.

Economical reuse of paper (including discarded newspapers, magazines, brochures, pamphlets and analogous publications as well as cardboard boxes and relatively clean (e.g., unprinted) discarded industrial paper) is gaining in importance at a rapid rate. Such paper is segregated from household waste and/or from industrial waste and/or is offered by paper recycling plants. Waste paper or recycled paper is one of numerous materials which are used to absorb water, urine, oil and/or other liquid substances. In addition to organic materials (such as shavings of wood, textiles and paper), it is also known to employ inorganic (such as mineral) substances including, for example, alumina, limestone, montmorillonite and many others. As of late, the utilization of inorganic raw materials for the making of litter or oil binding materials is considered to constitute an unacceptable waste of valuable natural resources. Moreover, the disposal of inorganic absorbent substances subsequent to their use as litter or oil binding material is a costly and time-consuming procedure. As a rule, such disposal involves piling up saturated inorganic materials at waste material gathering sites or combustion which, in turn, involves the development of excessive quantities of slag.

Waste paper is a presently preferred material which is to be converted into litter for cats, rabbits, hamsters and other relatively small animals which are kept in houses or apartments. As a rule, waste paper is comminuted by resorting to an impacting tool or by grinding in a mill. The thus obtained fragmentized waste paper is mixed with water and is converted into granules, pellets and/or similar relatively small particles. A drawback of such particulate material (when used as litter) is that the particles decompose on contact with urine and are converted into pulp or mush which complicates the disposal of such materials. Proposals to prevent decomposition of water-containing particles of litter include the admixture of certain additives.

Certain heretofore known proposals to make absorbent particles for use as litter or for other purposes are described in U.S. Pat. Nos. 4,263,873, 4,378,756, 4,409,925, 4,532,890, 4,560,527 and 4,607,594, in Canadian Pat. No. 1,172,025, in Dutch patent application No. 8304094, in French Pat. No. 2,618,641 and in published European patent application No. 0 121 055.

OBJECTS OF THE INVENTION

An object of the invention is to provide a novel and improved method of converting waste paper or recycled paper into particles of litter, oil absorbent material or the like in a simple, time-saving and inexpensive way.

Another object of the invention is to provide a method which ensures that the particles retain their shape (especially that the particles are not decomposed into a substance of pulpy or like consistency) when contacted by urine, oil or any other liquid material which is to be absorbed thereby.

A further object of the invention is to provide a method which renders it possible to produce particles exhibiting a high specific absorbency.

An additional object of the invention is to provide a method which renders it possible to reuse all kinds of waste paper including newspapers, magazines, brochures, pamphlets and other publications which contain a high percentage of printing ink and/or coloring matter.

A further object of the invention is to provide granules, pellets and like particles which are obtained in accordance with the above outlined method.

Still another object of the invention is to provide a novel and improved method of making litter and a novel and improved litter which is obtained by resorting to such method.

An additional object of the invention is to provide a novel and improved method of making oil absorbent particles which are obtained by resorting to the above outlined method.

Another object of the invention is to provide a novel and improved method of making absorbent particles which can be practiced by resorting to available machines.

A further object of the invention is to provide a method which can be resorted to for the making of particles of litter or oil absorbing material which not only exhibit highly satisfactory absorbency but also exhibit one or more additional desirable properties such as satisfactory resistance to pulping, ability to act as a disinfectant, ability to act as a deodorant, ability to exhibit desirable magnetic and/or electrostatic properties, ability to stand extended periods of storage and/or others.

SUMMARY OF THE INVENTION

One feature of the invention resides in the provision of a method of making an absorbent paper-containing granulate (this term is intended to embrace granules, pellets and other relatively small particles). The method comprises the steps of mechanically comminuting paper into fragments (e.g., into strips and/or other configurations), crumpling and intimately interlacing the fragments with attendant development of internal spaces in the thus interlaced and crumpled fragments, rough pressing the interlaced and crumpled fragments into prepressed formations, and converting the prepressed formations into granules.

The step of mechanically comminuting paper (e.g., wrappers, envelopes, cardboard boxes, newspapers and/or magazines, brochures and analogous publications) can include shredding such paper into irregular and/or strip-shaped fragments. More specifically, the step of mechanically comminuting can include severing paper with one or more knives.

The rough pressing step can include transforming interlaced and crumpled fragments into tubular bodies with a diameter of up to approximately 10 mm. The step of converting the prepressed formations can include forcing prepressed formations through a matrix having interstices in the range of 1–10 mm, particularly in the range of 3–6 mm.

The crumpling and interlacing step can comprise agitating the fragments in a stream of a gaseous fluid, particularly air. Alternatively or in addition to a treatment in a stream of gaseous fluid, the crumpling and interlacing step can comprise kneading the fragments.

The method can further comprise admitting (particularly admixing) one or more additives in the course of at least one of the comminuting, crumpling and interlacing, rough pressing and converting steps.

The admixing step can include admitting additives which reduce the specific weight of granules. Such weight reducing additives can be selected from the group consisting of porous fillers, polystryrene foam, polyurethane foam, microglass beads and wood. The weight reducing additive can also serve to alter the magnetic and/or electrostatic properties of the mixture of paper and additives.

The additives can include aromatic substances, e.g., aromatic substances which are selected from the group consisting of natural and synthetic essences and perfume oil. For example, natural essences can include pine oil and/or Peru balsam oil (e.g., that supplied by Jules Chiquet of Basel, Switzerland). A suitable synthetic essence is that known as Grasse oil which is supplied by Quest, Hamburg, Federal Republic Germany. A suitable perfume oil is that known as Lavandiff by dröm, Baierbrunn, Federal Republic Germany.

Furthermore, the additives can include deodorants such as chlorophyl, activated carbon, zinc ricinoleates and enzymes. Suitable enzymes are those known as Celuzyme TM 1500 supplied by Georg Walter, Zurich, Switzerland and Geruchsabsorber 73317 C supplied by H&R, Holzminden, Federal Republic Germany.

Still further, the additives can include disinfectants, e.g., those selected from the group consisting of reducing and oxidizing compounds, cationic tensides, amphotensides and alcohols.

The additives can further include substances which influence (particularly increase) the wettability of paper, e.g., substances selected from the group consisting of anionic and non-anionic tensides, polymers and oligomers.

The rough pressing step can be carried out in a flat bed press or in an annular matrix holding press. Such presses are supplied, for example, by Clerici & Co., Kronbühl, Switzerland.

It is futher within the purview of the invention to add water in the course of at least one of the comminuting, crumpling and interlacing, rough pressing and converting steps. For example, water can be added in quantities of up to 20 percent by weight of paper.

The granules can constitute particles of litter (e.g., litter used to gather urine and excrements of domesticated cats, hamsters and rabbits). Alternatively, such granules can constitute oil binding material.

The method can further comprise the step of coating the granules (converted formations), e.g., with a layer of clayey material such as bentonite, chalk and/or others. The coats can contain one or more disinfectants, deodorants, wetting agents, aromatic substances and/or others.

The novel features which are considered as characteristic of the invention are set forth in particular in the appended claims. The improved method itself, however, together with additional features and advantages thereof, will be best understood upon perusal of the following detailed description of certain presently preferred specific embodiments.

DESCRIPTION OF PREFERRED EMBODIMENTS

EXAMPLE I

Waste paper (e.g., sheets or sections of newspapers, magazines, pamphlets, brochures and/or other publications) were mechanically comminuted in a machine using one or more rotary, reciprocable and/or otherwise movable knives to transform the starting material into fragments of regular or irregular shape, e.g., into strips and/or other shapes having a length of 2-5 cm and a width of 2-3 cm. The thus obtained paper fragments were thereupon crumpled and/or otherwise deformed (hereinafter, this step will be referred to as crumpling) and interlaced to form one or more agglomerations or accumulations exhibiting a large number of internal spaces (cavities) capable of absorbing large quantities of urine or liquids contained in solid or partly solid excrements of cats, rabbits, hamsters or other small animals. For example, the crumpling and/or interlacing can involve introducing the fragments into and/or otherwise contacting the fragments with one or more streams of air and/or another gaseous fluid. Alternatively, or in addition to treatment in one or more streams of gaseous fluid, the crumpling and interlacing step or steps can include mechanically kneading the fragments of waste paper. In either event, the interlacing and crumpling step or steps result in a volumetric increase of up to 5000 percent, i.e., at a ratio of one-to-fifty.

The next step involved prepressing or rough pressing or initial pressing of the interlaced and crumpled fragments, for example, in a flat bed press or in an annular matrix molding press (such as the aforementioned presses which are available at Clerici & Co., Kronbühl, Switzerland). This resulted in the making of prepressed formations in the form of tubes (e.g., cylinders) with a diameter of up to 10 mm, preferably in the range of 3-6 mm. Such transformation of interlaced and crumpled paper fragments into prepressed formations (pressed articles) can be achieved by forcing the fragments through a matrix having interstices of a size in the desired range (e.g., 1-10 mm). The rough pressing step can take place simultaneously with the step of adding relatively small quantities of water or another liquid (e.g., by adding water in quantities of up to 10 percent by weight of paper).

It is often desirable or advantageous to admix to paper one or more additives in the course of at least one of the mechanical comminuting, interlacing and crumpling, rough pressing and final pressing (or converting) step which latter follows the rough pressing step. The conversion of prepressed formations (e.g., of the aforementioned tubes or cylinders with a diameter of up to or even in excess of 10 mm and containing up to 20 percent by weight of water) into small particles in the form of granules or pellets can be carried out in any suitable pelletizing or like press. The admission of water or another liquid can take place simultaneously with the rough pressing and/or converting step. For example, up to 10 percent by weight of water can be added in the course of the rough pressing step, and additional quantities of up to 10 percent by weight of water can be added in the course of the final pressing or converting step.

Suitable additives can include those which further enhance or promote the absorbency of the particles. In addition to or in lieu of absorbency enhancing additives, the method can involve the admixture or addition of one or more natural and/or synthetic disinfectants and/or one or more natural and/or artificial deodorants and/or one or more flavoring agents. For example, the additives can include aromatic substances in the form of natural or synthetic essences, perfume oils and/or others. Natural essences can include pine oil and/or Peru balsam oil (e.g., that supplied by Jules Chiquet of Basel, Switzerland). A suitable synthetic essence is that known as Grasse oil which is supplied by Quest, Hamburg, Federal Republic Germany. A suitable perfume oil is that known as Lavandiff which is supplied by dröm, Baierbrunn, Federal Republic Germany. Deodorants can include chlorophyl, activated carbon, zinc-ricinoleates and/or enzymes (suitable enzymes are those known as Celuzyme TM 1500 which is available at Georg Walter, Zurich, Switzerland, and Geruchsabsorber 73317 C supplied by H&R Holzminden, Federal Republic Germany. Disinfectants can include reducing or oxidizing compounds, cationic tensides, amphotensides, alcohols and others. Wettability of the particles can be increased by resorting to additives including anionic or non-ionic tensides, polymers and/or oligomers.

The thus obtained particles (granules, pellets or other suitable formations) are ready to be packed for storage or for shipment to distributors, retailers or individual users.

The particulate material which is produced in accordance with the Example I of the improved method exhibits a surprisingly satisfactory (high) specific absorbency and an equally desirable ability to retain its shape, i.e., not to be converted into a substance of pulpy, mushy, pappy or like consistency.

Furthermore, the improved absorbent particulate material can be disposed of in a simple, inexpensive and ecologically acceptable manner. For example, if the particulate material is used as litter, it can be disposed of by composting, by combusting with other waste materials to generate heat energy (e.g., to heat water, a gas or other materials, to drive certain parts and/or to heat homes and/or other dwellings), or by simply discharging it into the sewage system. Not only the paper (i.e., the main ingredient of the improved particulate material) but also the urine and/or excrements which are discharged by animals are biologically decomposable. In contrast to mineral and other inorganic litter, disposal of litter which is obtained in accordance with our method does not result in the development of hardening sediments which could cause serious problems, e.g., if admitted into the sewage system. Still further, disposal of litter which is obtained in accordance with the improved method can result in the development of biogas energy in a sewage plant. Moreover, sewage sludge does not contain any (or any additional) mineral sediments as a result of admission of used litter which is obtained in accordance with the improved method. This can entail a pronounced reduction of the quantity of sewage sludge.

A further advantage of the improved method is that, if the particles are used as litter, they are less likely to adhere to the skins or hair of animals. This is due to the aforediscussed mode of mechanically comminuting waste paper. This, as well as the highly satisfactory absorbency of litter which is obtained in accordance with the improved method renders it possible to use relatively small quantities of litter to thus achieve substantial savings due to reduced consumption as well as to simplify and speed up the disposal of spent litter.

EXAMPLE II

If the ultimate product is to be used as an oil absorbing material, the paper comminuting, crumpling and interlacing, rough pressing and converting steps are or can be the same as described above in the Example I. However, in lieu of admixing additives which enhance water absorbency of the particles, the method then involves the admixture of additives which exhibit hydrophobic and/or liophilic properties. This ensures that absorbency of the particles is high; however, instead of exhibiting a tendency to absorb water, the particles exhibit a pronounced tendency to absorb oil (either predominantly or exclusively). For example, the additives can include substances which reduce the specific density of the particles. Such substances can include porous fillers, polystyrene foam, polyurethane foam in various shapes, beads of microglass and/or wood. The admixture of just enumerated additives reduces the specific weight of the particles and enhances their ability to swim on water and to gather oil which was spilled as a result of leakage or sinking of an oil transporting vessel, as a result of leakage from one or more tanks which are mounted on land close to a body of water, or from another source of oil. A polystyrene which can be used with particular advantage is that known as STYROCELL (Trademark) produced by Shell.

The improved particles can also contain additives which exert a desirable influence upon the magnetic and/or electrostatic properties of the mixture of comminuted paper and additives. Additives which can exert a beneficial influence upon the mixture of comminuted paper and additives are those which were enumerated above as examples of materials serving to enhance the buoyancy (i.e., to reduce the specific density) of the particles.

Spent (oil-soaked) particles of oil absorbing material can be gathered and combusted with other waste to generate heat energy. The combustion is practically complete, i.e., the quantities of slag are minimal or zero. Alternatively, it is possible to dispose of oil-soaked particles by resorting to well known special biological waste disposal systems. It is even possible to simply pile up oil-soaked particles which were used as an oil absorbing material even though this is presently considered as the least desirable disposing procedure. The admixture of aforeenumerated buoyancy enhancing additives ensures that the particles do not sink in water even if they are fully soaked with oil, i.e., the likelihood of pollution is greatly reduced or fully eliminated. This simplifies the gathering of used up particles and greatly reduces the likelihood of damage to plants and water animals. It is further within the purview of the invention to coat the particles with layers of bentonite, chalk or other clayey or similar materials. The purpose of such coating is to enlarge the surfaces of the particles and/or to enhance the appearance of the particles and/or to impart to the particles one or more desirable characteristics. The coating material can contain aromatic agents, deodorants, sterilizing or disinfecting agents and/or others. The application of coats which contain one or more active ingredients can replace the corresponding mixing or admixing steps; for example, deodorants can be added as a result of the application of coats to finished particles. The same holds true for the application of additives which constitute disinfectants, wetting agents and/or other aforediscussed additives. Still further, certain additives can be added in several stages.

For example, deodorants can be admixed prior to or in the course of the converting step and thereupon again in the course of the coating step.

The manner of applying coats to absorbent particles in the form of granulates, tablets and the like is or can be the same as known from the art of coating pills or the like. Such coating can be carried out in available machines which are utilized for the making of pharmaceutical and like products.

Without further analysis, the foregoinq will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of making an absorbent granulate of paper, comprising the steps of mechanically comminuting paper into fragments; crumpling and interlacing the fragments with attendant development of internal spaces in the interlaced and crumpled fragments; rough pressing the interlaced and crumpled fragments into prepressed formations; and converting the prepressed formations into granules.

2. The method of claim 1, wherein said step of mechanically comminuting comprises shredding paper into irregular and/or strip-shaped fragments.

3. The method of claim 1, wherein said step of mechanically comminuting comprises severing paper sheets.

4. The method of claim 1, wherein said rough pressing step includes converting interlaced and crumpled fragments into tubular bodies with a diameter of approximately 10 mm.

5. The method of claim 1, wherein said converting step includes forcing the prepressed formations through a matrix having interstices in the range of 1-10 mm.

6. The method of claim 1, wherein said crumpling and interlacing step comprises agitating the fragments in a stream of gaseous fluid.

7. The method of claim 1, wherein said crumpling and interlacing step comprises kneading the fragments.

8. The method of claim 1, further comprising the step of admixing additives in the course of at least one of said comminuting, crumpling and interlacing, rough pressing and converting steps.

9. The method of claim 8, wherein said admixing step includes admitting additives which reduce the specific weight of granules.

10. The method of claim 9, wherein said weight reducing additives are selected from the group consisting of porous fillers, polystyrene foam, polyurethane foam, microglass beads and wood.

11. The method of claim 8, wherein said additives include weight reducing additives which alter the magnetic properties of the mixture of paper and said additives.

12. The method of claim 8, wherein said additives include weight reducing additives which alter the electrostatic properties of the mixture of paper and said additives.

13. The method of claim 8, wherein said additives include aromatic substances.

14. The method of claim 13, wherein said aromatic substances are selected from the group consisting of natural and synthetic essences and perfume oils.

15. The method of claim 8, wherein said additives include deodorants.

16. The method of claim 15, wherein said deodorants are selected from the group consisting of chlorophyl, activated carbon, zinc ricinoleates and enzymes.

17. The method of claim 8, wherein said additives include disinfectants.

18. The method of claim 17, wherein said disinfectants are selected from the group consisting of reducing and oxidizing compounds, cationic tensides, amphotensides and alcohols.

19. The method of claim 8, wherein said additives include substances which influence the wettability of paper.

20. The method of claim 19, wherein said substances are selected from the group consisting of anionic and non-anionic tensides, polymers and oligomers.

21. The method of claim 1, wherein said rough pressing step is carried out in a flat bed press.

22. The method of claim 1, wherein said converting step is carried out in an annular matrix molding press.

23. The method of claim 1, further comprising the step of adding water in the course of at least one of said comminuting crumpling and interlacing, rough pressing and converting steps.

24. The method of claim 23, wherein said adding step includes adding water in quantities of up to 20 percent by weight of paper.

25. The method of claim 1, wherein said granules constitute particles of litter.

26. The method of claim 1, wherein said granules constitute oil binding material.

27. The method of claim 1, further comprising the step of coating the granules.

28. The method of claim 27, wherein said coating step comprises applying to the granules coats containing a clayey material.

29. The method of claim 27, wherein said coating step comprises applying to the granules a material selected from the group consisting of bentonite and chalk.

30. The method of claim 1, wherein said converting step includes forcing the prepressed formations through a matrix having interstices in the range of 3-6 mm.

* * * * *